(12) United States Patent
Srivastava (10) Patent No.: US 9,419,958 B2
(45) Date of Patent: Aug. 16, 2016

(54) MULTI-TENANCY SUPPORT IN A CLOUD BASED DATA GRID

(71) Applicant: Oracle International Corporation, Redwood Shores, CA (US)

(72) Inventor: Ashish Srivastava, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 9 days.

(21) Appl. No.: 14/552,927

(22) Filed: Nov. 25, 2014

(65) Prior Publication Data

US 2016/0149882 A1 May 26, 2016

(51) Int. Cl.
*H04L 29/06* (2006.01)
*H04L 29/08* (2006.01)
*H04L 12/58* (2006.01)

(52) U.S. Cl.
CPC .............. *H04L 63/08* (2013.01); *H04L 51/046* (2013.01); *H04L 63/102* (2013.01); *H04L 67/02* (2013.01); *H04L 67/10* (2013.01); *H04L 69/329* (2013.01)

(58) Field of Classification Search
CPC ..... H04L 63/08; H04L 63/102; H04L 51/046; H04L 67/02
USPC ........................ 726/4, 5, 6; 709/202, 203, 213
See application file for complete search history.

(56) References Cited

U.S. PATENT DOCUMENTS

| | | | |
|---|---|---|---|
| 8,380,557 B2 | 2/2013 | Moon et al. | |
| 8,656,189 B2 | 2/2014 | Orsini et al. | |
| 8,667,140 B1 | 3/2014 | van Rotterdam et al. | |
| 8,775,599 B2 | 7/2014 | Bansal et al. | |
| 8,805,950 B1* | 8/2014 | Landsman | G06F 17/30902 709/213 |
| 2004/0068579 A1* | 4/2004 | Marmigere | H04L 29/06 709/242 |
| 2008/0222533 A1* | 9/2008 | Hankejh | G06Q 30/02 715/738 |
| 2010/0125612 A1* | 5/2010 | Amradkar | H04L 63/105 707/802 |
| 2012/0179646 A1 | 7/2012 | Hinton et al. | |
| 2013/0019000 A1 | 1/2013 | Markus et al. | |
| 2013/0239004 A1 | 9/2013 | Bihani et al. | |
| 2013/0275509 A1 | 10/2013 | Micucci et al. | |
| 2014/0173694 A1 | 6/2014 | Kranz | |

OTHER PUBLICATIONS

GigaSpaces, "XAP Elastic Caching", http://www.gigaspaces.com/content/xap-caching-edition-broschure, last downloaded Nov. 24, 2014, 2 pages.

Dowson Liu, "Roadmap of Big Data Machine", http://jtc1bigdatasg.nist.gov/_workshop3/17_Roadmap_of_BigDataMachine.pdf, last downloaded Nov. 24, 2014, pp. 1-14.

ScaleOut Software Blog, "How Do In-Memory Data Grids Differ from Spark?", http://blog.scaleoutsoftware.com/how-do-imdgs-differ-from-spark/, last downloaded Sep. 30, 2014, pp. 1-5.

(Continued)

*Primary Examiner* — Kambiz Zand
*Assistant Examiner* — Noura Zoubair
(74) *Attorney, Agent, or Firm* — Miles & Stockbridge PC (57) ABSTRACT

A system with a tenant aware in-memory data grid includes a data grid configured to store data in memory. A request manager is configured to receive a data grid label and a tenant identifier and to request a data grid entry based on the data grid label and tenant identifier. A data grid controller is configured to receive a request for data from the data grid based on a combined data grid label and tenant identifier. A security provider is configured to authenticate and authorize the request for data.

18 Claims, 7 Drawing Sheets

(56) References Cited

OTHER PUBLICATIONS

TIBCO Software Inc., "TIBCO ActiveSpaces Use Cases, How in-memory computing supercharges your infrastructure", http://www.tibco.co.in/multimedia/solution-brief-tibco-activespaces-use-cases_tcm8-18978.pdf, last downloaded Nov. 24, 2014, pp. 1-13.
Dominic Betts et al., "Developing Multi-Tenant Applications for the Cloud", Microsoft Third Edition, 2012, 246 pages.
SherWeb, "Microsoft SharePoint Hosting—Multi-tenant Cloud", http://www.sherweb.com/sharepoint/2013/multi-tenant-cloud, last downloaded Nov. 24, 2014, pp. 1-2.
Cloud Solutions, "SAP Business One Cloud—Multi tenant", https://cloud.ptempresas.pt/Pages/Catalog/ServiceDetail.aspx?s=Xw6vPMtc7xAFxMR9Z_Amw&cs=lyoyTeeXJrWBfarWtYkP8g&language=en-US, last downloaded Nov. 24, 2014, pp. 1-4.
Oracle Data Sheet, "Oracle Rightnow Chat Cloud Service", Mar. 2012, pp. 1-3.

* cited by examiner

MULTI-TENANCY SUPPORT IN A CLOUD BASED DATA GRID

FIELD

One embodiment is directed generally to a computer system, and in particular to a computer system that facilitates a cloud based data grid.

BACKGROUND INFORMATION

In high transaction volume computer systems, there has been a shift in system design to build enterprise applications around in-memory data stores to avoid latency issues encountered when storing data to disks. In-memory data stores can provide data grids (e.g., a data caching scheme) which allow database like functionality on these in-memory data stores.

Data security for in-memory data stores is important, and becomes even more important in a cloud based deployment where the same data grid is shared across multiple tenants using the same instance of an application.

Multi-tenancy refers to a principle in software architecture where a single instance of the software runs on a server, serving multiple client-organizations (tenants). Multi-tenancy contrasts with multi-instance architectures where separate software instances (or hardware systems) operate on behalf of different client organizations. With a multitenant architecture, a software application is designed to virtually partition its data and configuration, and each client organization works with a customized virtual application.

Typically, with multi-tenancy as a feature of a persistence store such as a database, separate schemas are created for each customer that can only be accessed by the credentials specific to that customer.

SUMMARY

In one embodiment, a system with a tenant aware in-memory data grid includes a data grid configured to store data in memory. A request manager is configured to receive a data grid label and a tenant identifier and to request a data grid entry based on the data grid label and tenant identifier. A data grid controller is configured to receive a request for data from the data grid based on a combined data grid label and tenant identifier. A security provider is configured to authenticate and authorize the request for data.

DETAILED DESCRIPTION

One embodiment provides multi-tenancy support for an in-memory data grid. Multi-tenancy support includes altering the cache to provide tenant or organization awareness for a single instance of the caching application, and security measures to restrict access to the cache based on credentials as well as based on cache subject restrictions. Providing multi-tenancy support reduces overhead and speeds processing time without sacrificing the privacy and security of end users and agents (e.g., in an ecommerce retail environment, an organization sales agent) accessing cached data.

In one embodiment, multi-tenancy support is provided for an in-memory data grid supporting a chat service that allows agents to chat with website users. The historical web browser actions of the user at a website can be stored in a multi-tenancy cache for later access by an agent associated with the website. The cache storage call for web browser actions can be proxied, the proxy adding a tenant identifier to the cache entry to designate the organization or tenant to which the cache entry belongs. When an agent attempts to access the user's web browser history in the cache, security measures provided by a multi-tenancy cache administrator system can authenticate and allow agents to access cache by subject without the need to execute separate caches for each website hosted by the chat service.

Figure 1:
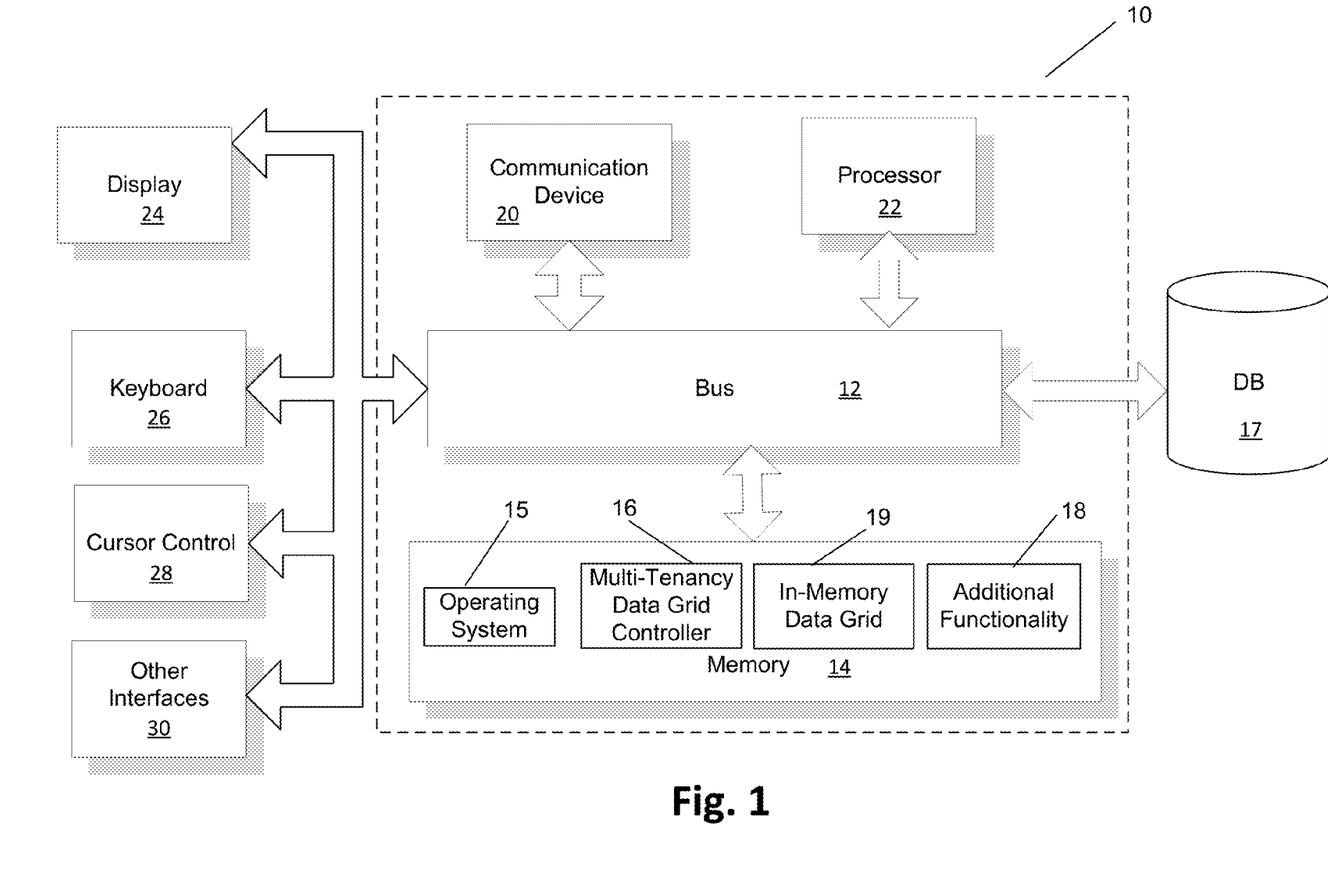
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system, such as an application deployed in the cloud. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card or Bluetooth adapter, to provide access to a network. Therefore, a user or agent may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 can be further coupled via bus 12 to a display 24, such as a Liquid Crystal Display ("LCD"). A keyboard 26 and a cursor control device 28, such as a computer mouse or touchscreen, can be further coupled to bus 12 to enable a user to interface with system 10. Other interface devices 30 can be coupled to processor 22.

In one embodiment, memory 14 stores software modules that provide functionality when executed by processor 22. The modules include an operating system 15 that provides operating system functionality for system 10. The modules further include a multi-tenancy data grid controller module 16 that provides support for an in-memory data grid 19, and any other functionality as disclosed in more detail below. System 10 can be part of a larger system, such as a cache server, web server, or chat server system. Therefore, system 10 will typically include one or more additional functional modules 18 to include the additional functionality. In one embodiment, additional functionality 18 can be provided by the "RightNow Chat Cloud Service" from Oracle Corp. In one embodiment, in-memory data grid 19 is "Coherence" from Oracle Corp. A database 17 is coupled to bus 12 to provide centralized storage for modules 16 and 18 and store one or more data sets to support contextual data processing, etc. Some embodiments may not include all of the elements in FIG. 1.

Multi-tenancy in general provides the ability to reduce system overhead for executing software applications. A multi-tenancy environment provides that only one instance of an application needs to be executed while providing support for access by multiple operators on behalf of different client organizations or tenants. Rather than each organization or tenant having its own execution and storage of the application in question, the application allows multiple organizations to access a shared memory data space.

However, because a multi-tenant architecture does not rely on the operating system to provide data separation, one potential problem with allowing one application to access the shared memory is that data from one organization can, either deliberately by malfeasance or accidentally by program error, be accessed by another organization. Therefore, security of an organization's data is a paramount consideration in deploying multi-tenancy support for an application.

An in-memory data grid, such as Coherence from Oracle Corp., can be a server software application that provides an in-memory data grid cache that supports other applications. In-memory means that the data storage that is managed is primarily operationally located in the RAM of the computer systems on which Coherence is running. Writing to and from RAM is much faster than writing to other types of storage, such as rotating media. As such, high data throughput systems can benefit from an in-memory caching program like Coherence. A data grid provides database-like access to stored memory. A data grid provides that memory is used in an access efficient manner, in terms of both writing and reading the data to and from memory. However, multi-tenancy and its requisite security measures are typically not integrated with known in-memory data grid service.

In contrast, embodiments provide multi-tenancy for an in-memory data grid, such as in-memory data grid 19. The data grid is made tenant aware in order to partition one organization's use from another organization's use. A tenant aware data grid has added functionality that can append a tenant identifier to a defined data grid structure. For example, a data grid structure can be a cache scheme that defines a format for entries to a cache called "datatypeCache." Making the cache tenant aware can be done by appending a tenant identifier to the cache scheme (e.g., "datatypeCache_tenantid"). Where the tenant identifier is related to an organization or website, the tenant identifier can be a moniker associated with the organization or website (e.g, "datatypeCache_websitename" or "datatypeCache_companyname"). Security is provided to prevent one organization from accessing, either purposefully or inadvertently, another organization's data.

For in-memory data grids that do not natively support multi-tenancy, a proxy can provide a go-between to utilize an existing data grid service to make it multi-tenant and secure between tenants. Alternatively, existing in-memory data grid servers can be altered to provide the same functions as the proxy to provide multi-tenancy in the data grid and security between tenants.

Although cache is disclosed as an example of a use of an in-memory data grid in the following discussion, one skilled in the art will understand that an in-memory data grid can be used for other purposes consistent with the embodiments discussed herein. As used herein, "tenant" and "organization" are synonymous in reference to the use of a multi-tenant data grid.

Figure 2:
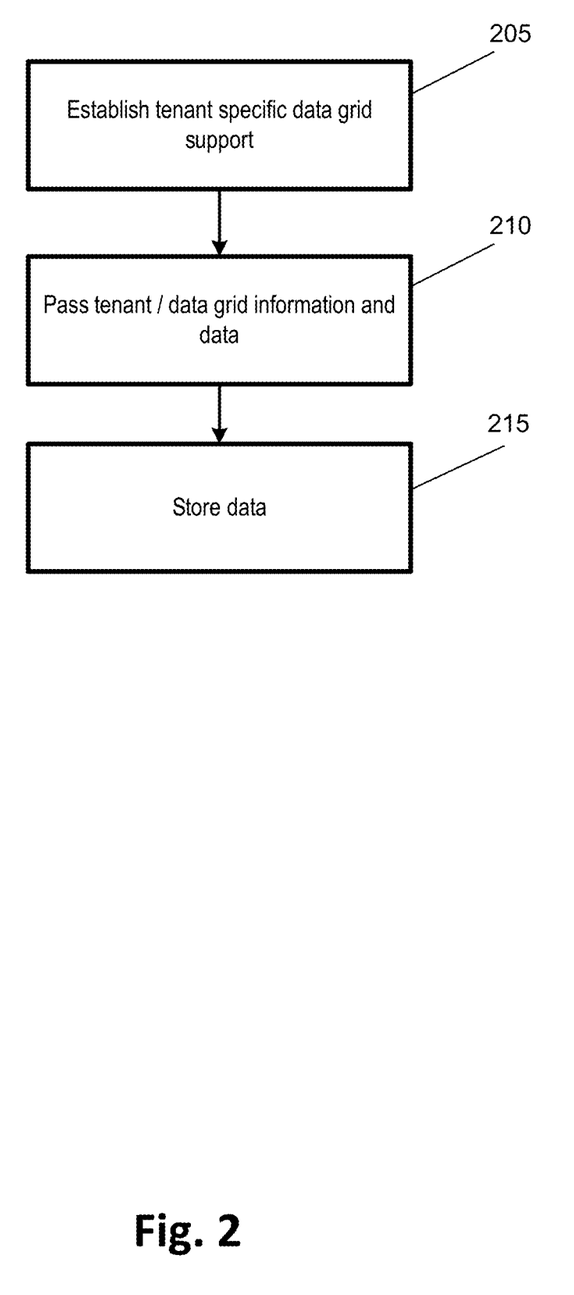
FIG. 2 is a flow diagram of the functionality of the controller module of FIG. 1 when storing data in a data grid with multi-tenancy support in accordance with some embodiments.

FIG. 2 is a flow diagram of the functionality of controller module 16 of FIG. 1 when storing data in a data grid with multi-tenancy support in accordance with some embodiments. In one embodiment, the functionality of the flow diagram of FIG. 2 (and of FIGS. 3-6 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In some embodiments the flow of FIG. 2 can be executed by an in-memory data grid server such as a caching server. At 205, tenant specific data grid support can be established. For example, where the data grid is for a server side website cache, a cache scheme or similar logical definition of the cache layout for the data grid can be altered to accommodate appended site information. For example, a cache or data grid scheme entry for a dataName data label can be altered to dataName_*, where the asterisk is to be replaced by tenant information, such as a site name or customer identifier.

At 210, tenant information is passed with the data grid data label and the data to be stored. For example, the tenant information can be a site name or customer identifier and the data grid data label can be a table name based on a defined data grid scheme. For example, where the data grid is for a server side website cache, a user can access a customer website. The website can pass information regarding the user's website visit to be stored in a cache table, e.g., dataName. For example, multi-tenancy data grid controller module 16 can match dataName with dataName_* in the scheme (or the specified table in the storage request can be dataName_*). The asterisk can be replaced with the sitename or customer identifier. At 215, the data is stored in the data grid. For example, the data for the website visit can be stored in a cache for the customer, e.g., dataName_siteName.

The flow of FIG. 2 can be executed by a proxy that receives the tenant information and data entry, and creates or updates an entry in the data grid. If necessary, the proxy can establish a new data grid table for the example (not pictured) dataName_siteName, or if already established, can write a new data entry into the table. In some embodiments, multi-tenancy support can be incorporated directly into the in-memory data grid controller, such as controller 16. In such embodiments, controller 16 can receive the dataName and siteName and the data to be stored and create a new grid table if necessary to store the data. Multi-tenancy data grid controller 16 can recognize that a data type should support multi-tenancy by providing a scheme, such as in flow element 205, with a particular naming convention, such as the example dataName_*, to signify that the data grid entry should support multi-tenancy. In some embodiments, the data grid can have some entries that support multi-tenancy and other entries that do not, determined according to the naming convention. For example, the data grid controller may use its own data grid entries to store data that do not need multi-tenancy support. For another example, data grid controller 16 can support an entry for a received dataName in non-multi-tenant entry or dataName_* in a multi-tenant entry.

Figure 3:
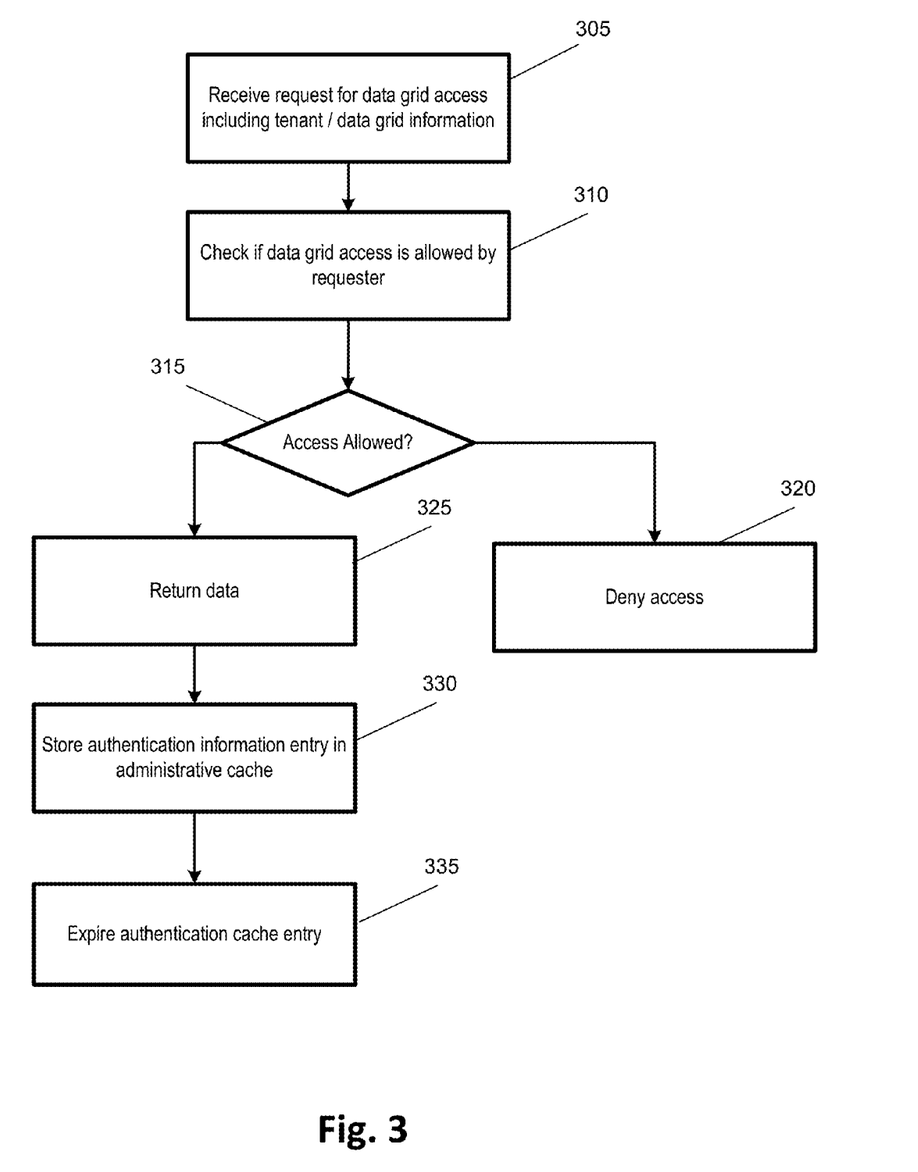
FIG. 3 is a flow diagram of the functionality of the controller module of FIG. 1 when retrieving data in a data grid with multi-tenancy support in accordance with some embodiments.

FIG. 3 is a flow diagram of the functionality of controller module 16 of FIG. 1 when retrieving data in a data grid (such as an in-memory cache) with multi-tenancy support in accordance with some embodiments. At 305, a request is received to access data (such as a cache entry) in the data grid. If the request is for a multi-tenant entry, the request should include the tenant name (such as a site name or customer identifier) and a data grid label name (such as a cache name like dataName or dataName_*). At 310, the requester is checked to see if the requester is allowed to access the data grid entry. The check to allow access is discussed in more detail below in connection with FIG. 4. At 315, if the requester is not allowed to access the data, then at 320 access is denied. Otherwise, if the requester is allowed to access the data, at 325 the requested data is returned.

At 330, authentication information can be stored in an administrative cache for data grid controller 16. This information can include requester credentials and session information so that future requests can be authorized more quickly and without the need to receive authentication information again. At 335, if authentication information is saved for the requester by data grid controller 16, then the authentication cache entry can be expired periodically or after a certain period of inactivity to reset the authentication status of the requester.

Figure 4:
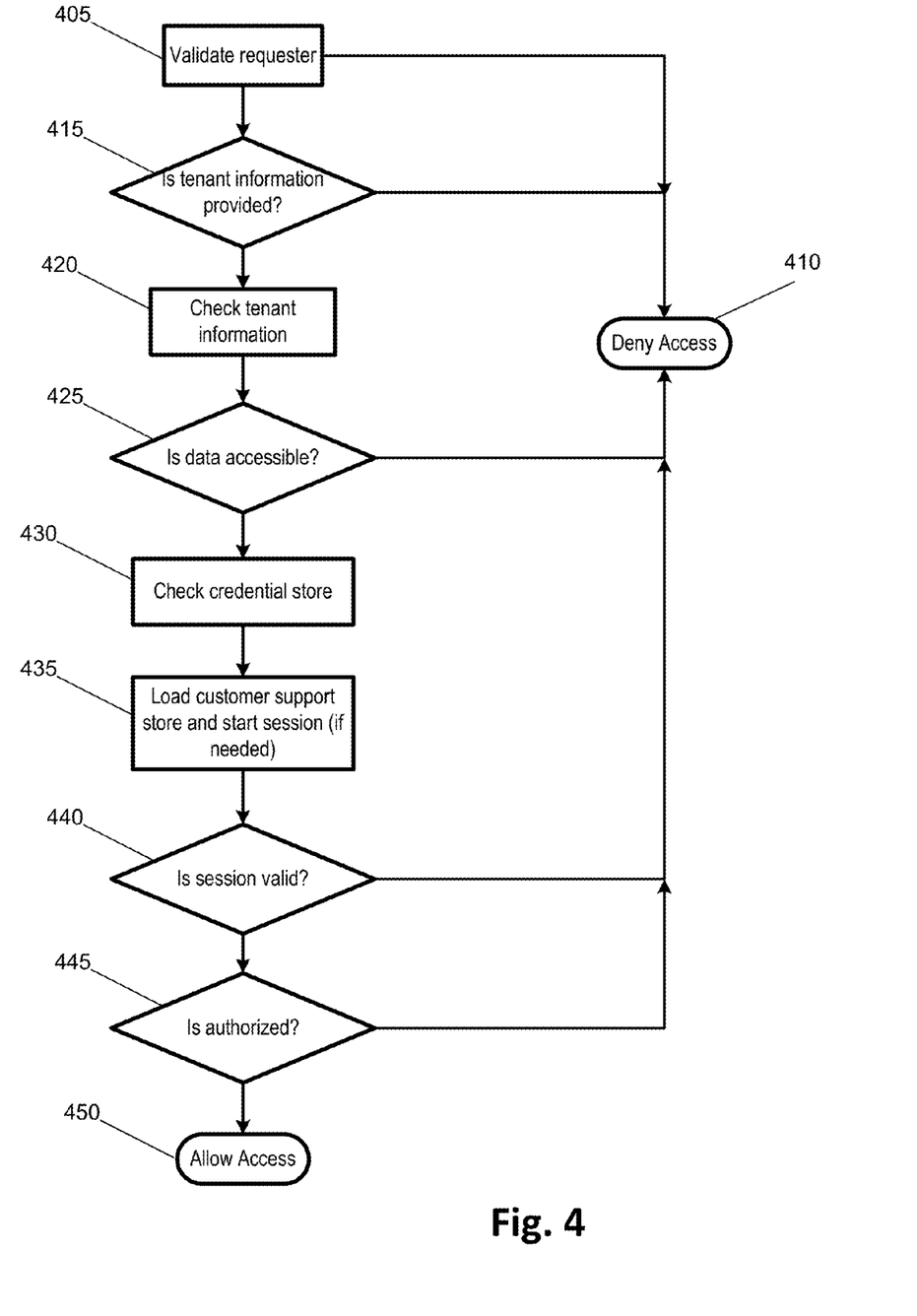
FIG. 4 is a flow diagram of the functionality of the controller module of FIG. 1 when retrieving data in a data grid with multi-tenancy support in accordance with some embodiments.

FIG. 4 is a flow diagram of the functionality of controller module 16 of FIG. 1 when retrieving data in a data grid with multi-tenancy support in accordance with some embodiments. The flow of FIG. 4 provides further details of the access flow element 310 of FIG. 3. The result of each flow element of FIG. 4 can be stored in an authentication cache as described in conjunction with flow element 330 of FIG. 3. The flow of FIG. 4 provides authentication and authorization for a request for data from data grid 19. At 405, the requester is validated. Validation can be accomplished using any security provider or technology. For example, if a requester is already validated in some system, the same validation credentials and techniques (e.g., Lightweight Directory Access Protocol ("LDAP")) can be used to validate the user in the security context of flow element 405. If the requester cannot be validated, then at 410, access will be denied.

At 415, the system checks if the request provided tenant information. Tenant information can include a site name, customer identifier, or other appropriate identifier. If tenant information is not provided and the request is for a multi-tenant data grid entry, then at 410, access will be denied.

At 420, the tenant information is checked to determine if it can be accessed. For example, the tenant may not allow any access to the data grid data. Or, the tenant may specify certain users or groups of users that can request access to its data grid data. This provides security policies for tenants or customers to apply against user requests to specify any type of tenant specific access parameters. In some embodiments, tenant information can be a particular id associated with the tenant and the tenant can specify different security policies for each requester (subject) or default policies for the tenant. For example, the id can be a particular website name operated by a single tenant. The website name can have one access security policy and the tenant can have another. The tenant information that is checked can be compared against a requester profile (subject information) that can be provided as a result of the validation flow element at 405. If a requester profile is not provided, then the check of tenant information can fail.

At 425, if the tenant is not accessible following the tenant information check at 420, then at 410, access will be denied. Otherwise, the flow will continue to element 430 to check a credential store. The credential store can check the requester against existing credential information. If existing credential information is not available for the requester, at 435 a session can be started and credential information can be loaded from another source. For example, if the credential store is a cache memory, then requester information can be loaded from a requester profile into the credential cache and a session can be started to utilize the credential cache to provide an operational data space as the requester interacts with data from data grid 19.

At 440, if the session is not valid, then at 410, access will be denied. If the session is valid, then at 445, the requester can be checked for authorization to the requested data from data grid 19. If the requester is not authorized, then at 410, access will be denied. If the requester is authorized, then at 450, access will be allowed.

As described above, the flow of FIG. 4 provides one way of authenticating a requester and authorizing the requester to access the requested data from data grid 19. In some embodiments, session management or customizable security access may not be implemented which can eliminate some of the flow elements. Likewise, in some embodiments, other intermediary flow elements can be incorporated to provide other heightened security, such as encryption. As such, one skilled in the art will understand that the flow of FIG. 4 can be readily modified to accomplish the goal of authentication and authorization of a requester as used above.

Figure 5:
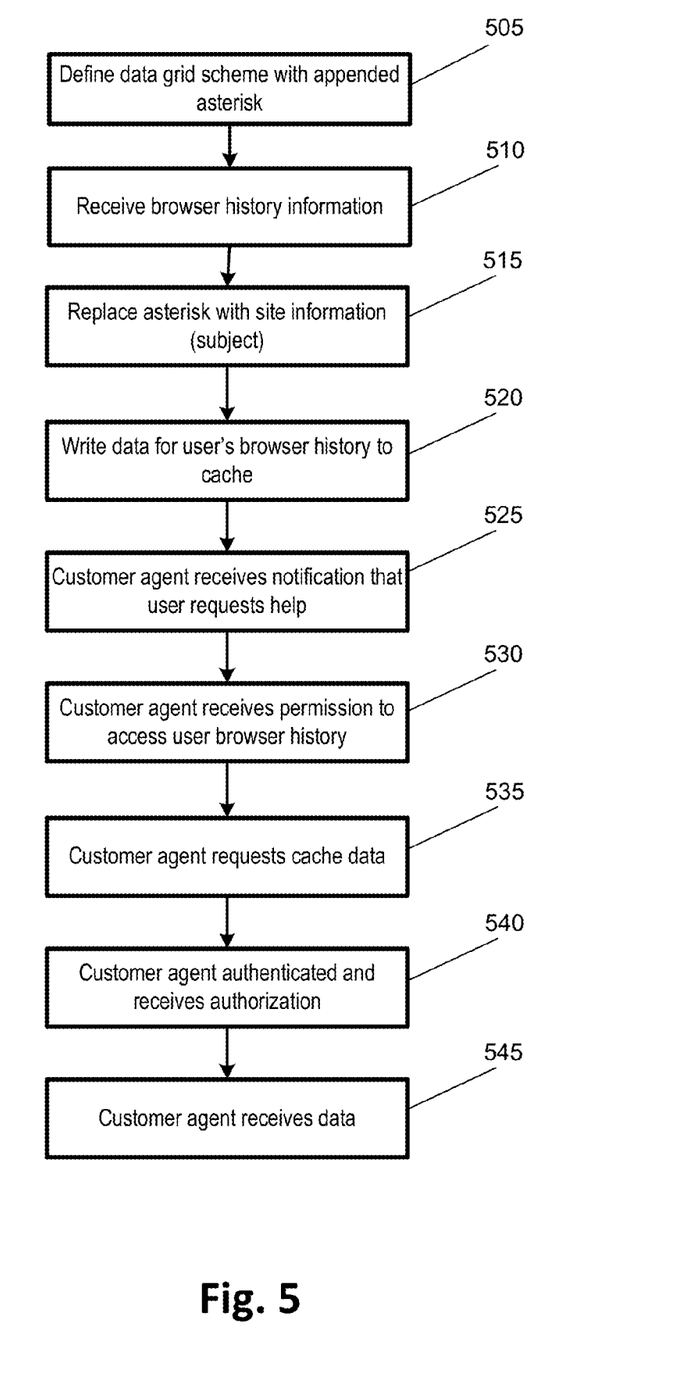
FIG. 5 is a flow diagram of the functionality of the controller module of FIG. 1 when operating a data grid cache with multi-tenancy support in accordance with some embodiments for a Coherence embodiment.

In one embodiment, in-memory data grid 19 can be cache memory and controller 16 can be Oracle Corp.'s "Coherence" platform or another similar data grid cache memory controller. FIG. 5 is a flow diagram of the functionality of controller module 16 of FIG. 1 when operating a data grid cache with multi-tenancy support in accordance with some embodiments for a Coherence embodiment. In some embodiments, a user can visit a customer website that tracks the user's progress through the site by writing to a data cache. At 505, the data cache can be defined by a data grid scheme element named VisitorBrowserHistory_*. Other tenant specific scheme elements can be defined in a similar way, by appending an underscore asterisk ("_*"), or some other indicator, to the scheme element to signify that a tenant specific (multi-tenant) cache element is desired. At 510, browser history information can be received from the user's web browser along with site information, e.g., exampleSite, and a visitor identification. In some embodiments, browser history information can be obtained and sent along with a website request using scripting language executed at the user's browser. In some embodiments, browser history information can be sent by a script handler on the webserver that passes visitor information and webpage information to the cache. At 515, the asterisk in the scheme can be replaced with site information, e.g., VistorBrowserHistory_exampleSite, and if not yet existing in the cache memory, the cache for VistorBrowserHistory_exampleSite can be initialized. At 520, data for the user's browser history can be written to the VistorBrowserHistory_exampleSite data grid table. At 525, a customer agent can receive a notification that a website user is requesting assistance on the website via an interactive browser-based chat interface. At 530, the customer agent can receive permission from the user to access the user's VistorBrowserHistory from VistorBrowserHistory_exampleSite. At 535, the customer agent can request access to the VistorBrowserHistory_exampleSite data from cache controller 16 based on the visitor identification. After authentication and authorization at 540, the data can be provided to the customer agent at 545.

Figure 6:
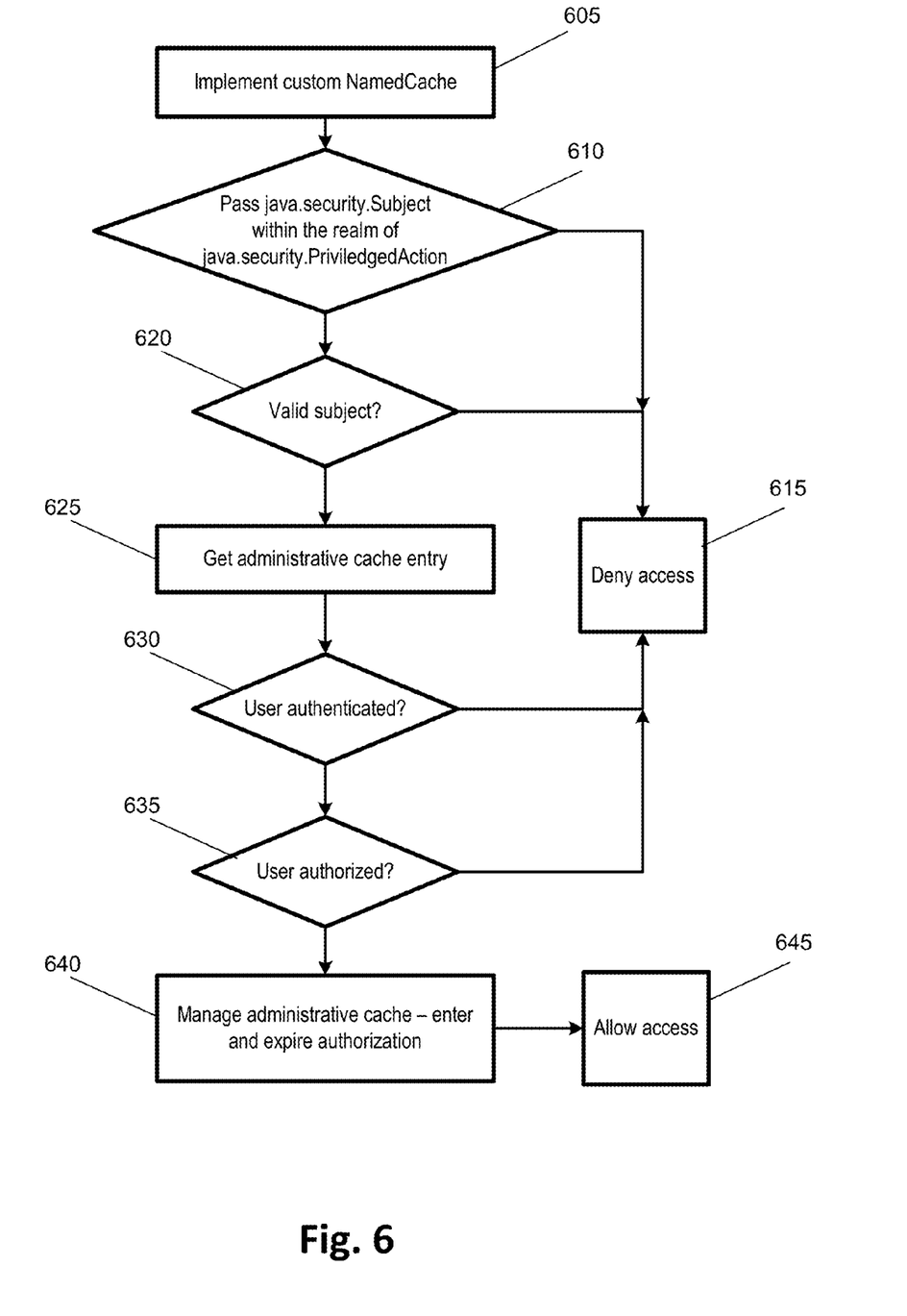
FIG. 6 is a flow diagram of the functionality of the controller module of FIG. 1 when authenticating and authorizing a requester associated with data grid cache with multi-tenancy support in accordance with some embodiments.

FIG. 6 is a flow diagram of the functionality of controller module 16 of FIG. 1 when authenticating and authorizing a requester associated with data grid cache with multi-tenancy support in accordance with some embodiments. FIG. 6 is one example of the authentication and authorization provided at flow element 540 of FIG. 5. Oracle's Coherence uses Java programming controls for access and control. At 605, to achieve multi-tenancy in Coherence and maintain security required to prevent one customer from accessing another customer's data, a custom implementation of Coherence's NamedCache can be used that proxies the NamedCache methods with a method check if the invocation of that method is allowed by the user. At 610, the invoker (customer agent) of the NamedCache method, must pass the java.security.Subject and the requested action has to be invoked within the realm of java.security.PrivilegedAction. Passing java.security.Subject within the realm defined under java.security.Privileged Action ties to the validation of the requester, as described in 405 of FIG. 4. In particular, the cache is made subject aware in that the cache scheme in Coherence can expect a Subject to be passed by the Tenant to be validated by the cache scheme before providing access to its data. Each Subject has Principals that contains Tenant's Information like its credentials. If the invoker cannot pass these java.security parameters, then at 615 access will be denied. At 620, the subject can be validated for access to the particular tenant information using a configured security provider initialized by the custom implementation of Coherence's NamedCache.

At 625, the security provider can construct a cache key from the customer agent information (Principals) and invoke a cache_get( ) against an internal administrative cache used by controller 16. This administrative cache can be configured with a Coherence cache loader to interact with a credential data store that stores customer credentials. The cache loader is flexible and can be a plugin that is specific to accessing the credential data store. Customer credentials can be stored in a data base, enterprise LDAP, or another suitable structure.

At 635, when the customer agent is authenticated at 630, the customer agent can be checked for authorization to read or write to the cache it is accessing. Authorization can be implemented by java.security.PropertyPermission or another suitable permission system. At 640, when the user is authenticated and authorized, an entry can be inserted into the administrative cache so that subsequent access to the cache does not need to check the credential data store, a potential bottleneck depending on the speed and latency of accessing the credential data store. Entries in the administrative cache can be expired frequently so that the customer agent is authenticated at least within a certain time interval. For example, entries can be expired at regular intervals, after a certain time from creation, or after a certain time from last access. At 645, user is allowed access.

Figure 7:
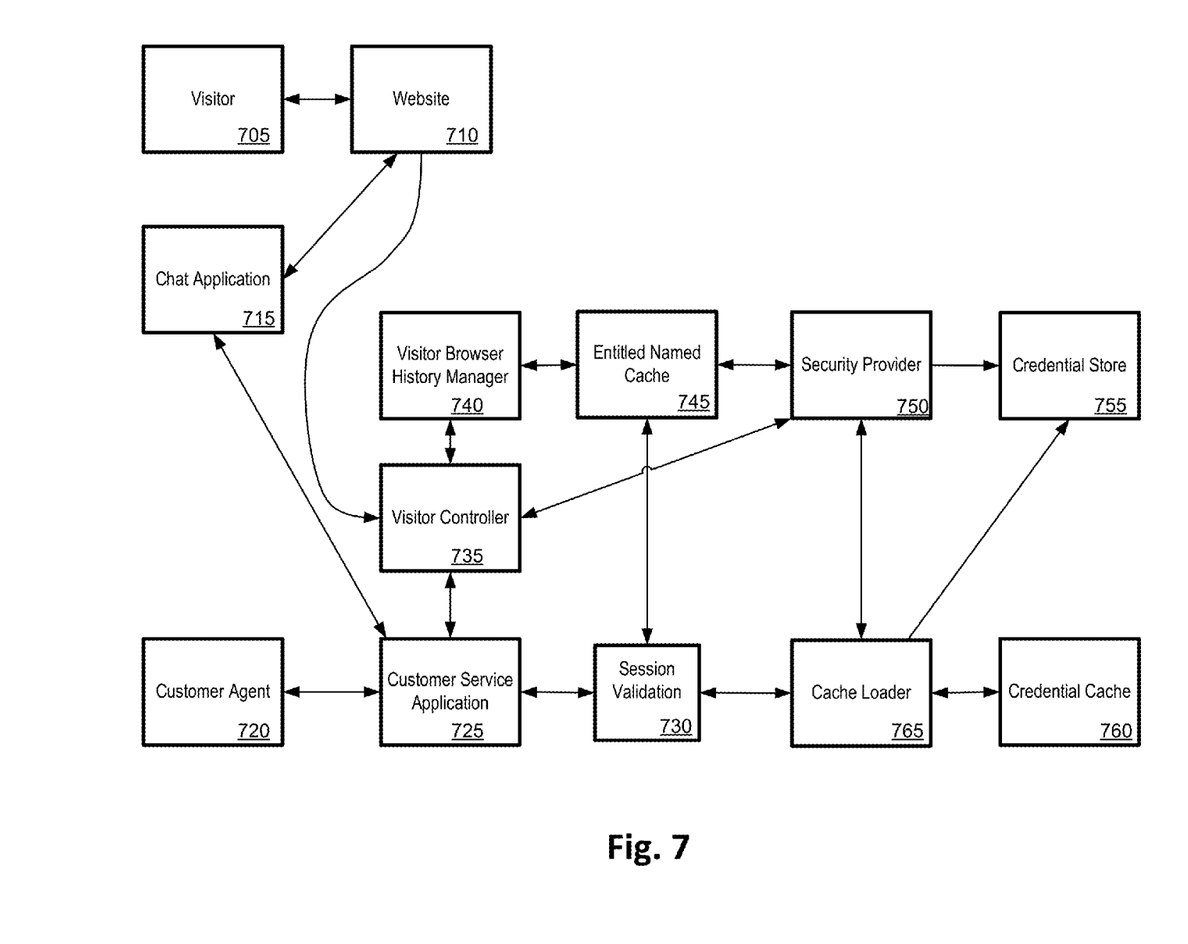
FIG. 7 is a block diagram of the functionality of a server/system in accordance with an embodiment of the present invention.

FIG. 7 is a block diagram of the functionality of a server/system in accordance with an embodiment of the present invention. An arrow represents a flow of information to or from a block, however, one skilled in the art will recognize that data can flow in both directions even if an arrow is not double-ended. Also, the connections shown are only representative and blocks that are not shown to be directly connected can be connected in other embodiments. A visitor 705 can access and interact with a customer website 710, such as an ecommerce website. Website 710 can interact with visitor 705. Website 710 can store visitor browser history information in an entitled named cache 745, managed by Oracle's Coherence platform and configured to support multi-tenancy as disclosed herein. If cache scheme management for VisitorBrowserHistory exists, it can be altered to VisitorBrowserHistory_* or if it does not yet exist, cache scheme management for can be included for VisitorBrowswerHistory_*. In some embodiments, other similar in-memory data grid management may be used. Stored visitor browser history information can include a visitor identification associated with the visitor. Entitled named cache 745 can include functions designed to support subject aware multi-tenant caching, including overriding existing functions as appropriate. Visitor 705 can request assistance from a customer agent 720 using a browser based chat application 715.

Customer agent 720 can use a customer service application 725 to interface with visitor 705 through chat application 715. Customer agent 720 can request visitor browser history through customer service application 725. A session validation block 730 for customer service application 725 can provide session validation information for customer agent 720. Validation block 730 can be a Coherence invocable that checks if agent 720's session and account ID are valid. Validation block 730 can interface with application 725, such as a chat application provided by "RightNow Chat Cloud Service" from Oracle Corp., through the application's programming interface ("API") manager.

Application 725 can request visitor information through a visitor controller 735. Visitor controller 735 can map requests to valid fetch or record operations by using, for example, a Spring Controller Bean in Java to map request Uniform Resource Locators ("URLs") to fetch or record operations. When using a Spring Controller Bean, controller 735 can expect hyper-text transfer protocol ("HTTP") request headers when a fetch request is invoked, can include agent 720's session ID (e.g., X-JSESSIONID, or other defined header) and agent 720's account ID (e.g., X-AID, or other defined header). Controller 735 can pass request headers with session and agent information received from application 725 to an internal security provider, such as security provider 750, for application 725 as additional security. The internal security provider accessed by controller 735 can validate access of the requesting agent 720 and agent's session using an external credential store, such as external credential store 755. Controller 735 can pass fetch and record operations to visitor browser history manager 740. In some embodiments, visitor browser history manager 740 can be used as a manager injected into visitor controller 735 via the Spring Controller Bean. Visitor browser history manager 740 can act as a proxy to access cache 745 (e.g., provide fetch and persist methods to cache) by providing subject information, such as a requester information and a website identifier to cache 745, and provide retrieved data back to visitor controller 735 or application 725.

Entitled named cache 745 can be a subject aware multi-tenant custom implementation of Coherence cache to provide a multi-tenancy framework based on the defined cache scheme as discussed above. Subject awareness of cache 745 supports a multi-tenancy framework by tying subject information to organization or tenant identifiers associated with cache entries. Entitled named cache 745 can use a pluggable security provider 750 to determine authentication and authority of customer agent 720. Entitled named cache 745 can check agent session 730 and account validity through security provider 750 each time a data fetch or query is received.

Security provider 750 can be a pluggable class that integrates external credential store 755 to check access validity. In some embodiment security provider can be an aspect of customer service application 725. Security provider 750 can also use an internal credential cache 760 to maintain expiring agent access validity information. Security provider 750 can check session validity 730 provided by application 725 to check if the agent session and agent identifier are valid. If agent 720 is authenticated, security provider 750 can check if the agent 720 are authorized to perform a requested function associated with the tenant or organization. In some embodiments, authentication of agent 720 can provide immediate authorization for agent 720.

Credential store 755 can be an internal or external database, an LDAP, or other credential store. In some embodiment, credential store 755 can be implemented by a database that manages customer information, such as the "Customer Experience Solutions" ("CX") platform from Oracle Corp.

Credential cache 760 can be accessed and managed by a cache loader 765 and can be used by security provider 750. In embodiments using CX, a cache loader 765 can be a CXCacheLoader that is configured to integrate with CX. Cache loader 765 can be invoked on a cache node, for example, in a cloud environment. Cache loader 765 can access credential cache across multiple cloud nodes or choose one node at random to check credential cache 760 to see if agent 720 is valid. In embodiments using Coherence, cache loader 765 can use Coherence's invocation service to execute an invocable associated with agent session validation 730 on a randomly picked compute node. Cache loader 765 can specify in credential cache 760 that an agent's session for a given visitor's visitor ID is allowed access or not allowed access. Thus, credential cache 760 can include results from requests that generate entries indicating access is allowed or that access is denied. For example, credential cache 760 can include an entry that specifies that an agent does not have access to data associated with one site, but does have access to data associated with another of the customer's sites.

In some embodiments, when a fetch operation is called, visitor browser history manager 740 executes a query against the cache protected by entitled named cache 745. Cache controller 745 delegates the request to security provider 750 if the data access should be granted. Security provider 750 can check if credential cache 760 already has an entry showing customer agent 720 is authenticated and authorized by, for example, using a carefully constructed cache key that includes an agent session identifier and a visitor's visitor identifier. If the entry in credential cache 760 is already present and is allowed, the data is filtered and returned. If the entry is already present and is disallowed the data access is denied. If no entry is present in credential cache 760, then it triggers a load call to cache loader 765 that checks if the agent session and agent identifier are valid. A new entry can be inserted into credential cache 760 signifying whether access should be granted or denied. Entries in credential cache 760 can be time bound and expire after some period (e.g., one hour). Credential store 755 need not be accessed for a given agent session and visitor's visitor identification combinations until after the configured credential cache entry expires.

In some embodiments, for customer agent 720, security can be based on standard Java Authentication and Authorization ("JAAS") framework and low level data security support from Oracle Coherence. In a multi-tenant context, by design a privileged activity is expected to be executed against the Coherence cache services in the context of a given subject. A subject includes agent information within the context of a customer identifier, website context, or other identity context that is obtained and can be verified by Coherence with each access to the cached data. Access to the visitor browser history cache either to record an event or fetch data from can be mitigated through a custom Coherence cache. All data fetch requests from this cache are checked if the request should be granted or denied. The grant or deny to agent 720 can be determined by whether the agent's session is still valid. To access visitor browser history, the agent session is passed by the client at application 725 (using for example, a dot-net application or a browser based client) as an attribute of an agent's identity that can typically be called as a "Principal." Any privileged action taken in the Java Virtual Machine ("JVM") will provide subject information. The subject is then checked, its agent session extracted and passed to security provider 750 for the authentication validation.

In some embodiments, server side security provider 750 Provider is a pluggable Java class defined in a cache cloud cluster's cache configuration. This security provider can check if the passed agent session exists in specifically configured credential cache 760. If the agent session is not found in credential cache 760, credential cache 760 can trigger a call to credential store 755 through cache loader 765. Cache loader 765 can be a standard Coherence component used to load data on demand from an external system like credential store 755.

If the session is successfully validated in credential store 755, the session is then added to credential cache 760 with an in-memory expiration. Once credential cache 760 contains a valid agent session, no further calls to credential store 755 are required for the duration of its existence in credential cache 760 for a given cache key combination of agent session and the visitor identifier. For example, in the case of a long running session where the session expires in credential cache 760, if agent 720 tries to pass the same session identifier again, another call will be triggered to credential store 755 for validation. Once authenticated and re-validated, security provider 750 can provide the subject through an authorization step, allowing agent 720 read and write access to the Visitor Browser History cache.

In some embodiments, a customized version of Entitled Named Cache can be implemented in Coherence. An extensible markup language ("xml") file can be defined and passed to Coherence when the nodes of a cluster are started using the system property -Dtangosol.coherenc.cacheconfig=cache-config.xml. An example cache-config.xml file can be defined as follows:

```
<cache-config>
<caching-scheme-mapping>
    <cache-mapping>
        <cache-name>VisitorBrowserHistoryItem_*</cache-name>
        <scheme-name>entitled-scheme</scheme-name>
        <init-params>
            <init-param>
                <param-name>security-provider</param-name>
                <param-value>com.rightnow.visitor.manager.VBHSecurityProvider</param-value>
            </init-param>
            <init-param>
```

```xml
            <param-name>credential-cache</param-name>
            <param-value>USER_CRED</param-value>
          </init-param>
        </init-params>
      </cache-mapping>
      <cache-mapping>
        <cache-name>USER_CRED</cache-name>
        <scheme-name>admin-distributed-scheme</scheme-name>
      </cache-mapping>
    </caching-scheme-mapping>
    <caching-schemes>
      <distributed-scheme>
        <scheme-name>admin-distributed-scheme</scheme-name>
        <service-name>AdminDistributedService</service-name>
        <backing-map-scheme>
          <read-write-backing-map-scheme>
            <internal-cache-scheme>
              <local-scheme>
                <high-units>10MB</high-units>
                <unit-calculator>BINARY</unit-calculator>
                <expiry-delay>30m</expiry-delay>
              </local-scheme>
            </internal-cache-scheme>
            <cachestore-scheme>
              <class-scheme>
                <class-name>com.rightnow.visitor.persistence.CXCacheLoader</class-name>
                <init-params>
                  <init-param>
                    <param-type>
                      com.tangosol.net.BackingMapManagerContext
                    </param-type>
                    <param-value>{manager-context}</param-value>
                  </init-param>
                </init-params>
              </class-scheme>
            </cachestore-scheme>
          </read-write-backing-map-scheme>
        </backing-map-scheme>
        <autostart>false</autostart>
      </distributed-scheme>
      <class-scheme>
        <scheme-name>entitled-scheme</scheme-name>
        <service-name>EntitledScheme</service-name>
        <class-name>com.rightnow.visitor.persistence.EntitledNamedCache</class-name>
        <init-params>
          <init-param>
            <param-type>string</param-type>
            <param-value>{cache-name}</param-value>
          </init-param>
          <init-param>
            <param-type>string</param-type>
            <param-value>vbh-cache-config.xml</param-value>
          </init-param>
          <init-param>
            <param-type>string</param-type>
            <param-value>{security-provider}</param-value>
          </init-param>
          <init-param>
            <param-type>string</param-type>
            <param-value>{credential-cache}</param-value>
          </init-param>
        </init-params>
        <auto-start>false</auto-start>
      </class-scheme>
    </caching-schemes>
</cache-config>
```

Pseudo code for some of the functionality associated with a security provider can be as follows:

```
package com.oracle.cx.chat.security;
import javax.security.auth.Subject;
import java.security.Principal;
public abstract class AbstractSecurityProvider implements SecurityProvider
public boolean checkAccess (Subject subject)
    if (subject is null) OR (Principal is not found)
        return false;
    if (admin cache is set to authorized)
        return true;
    if (authorized user)
        return true;
    else return false;
```

Pseudo code for some of the functionality associated with an entitled named cache class is implemented as follows:

```
package com.oracle.cx.chat.grid;
import com.oracle.cx.chat.security.SecurityProvider;
import com.tangosol.net.CacheService;
import com.tangosol.net.ConfigurableCacheFactory;
import com.tangosol.net.DefaultConfigurableCacheFactory;
import java.security.AccessControlContext;
import java.security.AccessController;
class EntitledNamedCache extends WrapperNamedCache
{
    Define SecurityProvider sProvider;
    Define hashmap Map;
    protected static ConfigurableCacheFactory ensureCacheFactory(String sConfig)
            return a custom ConfigurableCacheFactory that can be used to instantiate Cache;
    EntitledNamedCache (String sName, String cacheConfig, String securityProvider, String credentialCache)
            //constructor that sets the Name of the Cache that the custom named cache is applied to
            //a valid principal and the name of the cache config
    //Check access before returning state information, e.g.:
    String getCacheName( )
            If (checkAccess)
                    return super.getCacheName( );
    CacheService getCacheService( )
            If (checkAccess)
                    return super.getCacheService( );
    boolean isActive( )
            If (checkAccess)
                    return super.isActive( );
    Object put(Object oKey, Object oValue, long cMillis)
    //put key and value with the time-to-live after checking if the request is made from a valid user thread.
            If (checkAccess);
                    return super.put(oKey, oValue, cMillis);
    boolean isEmpty( )
    //Returns if the cache is empty or not if the request is made from a valid user thread.
            If (checkAccess);
                    return super.isEmpty( );
    boolean containsKey(Object oKey)
    //The method checks if the passed key exist in the Cache if the request is made from a valid user thread.
            If (checkAccess);
                    return super.containsKey(oKey);
    boolean containsValue(Object oValue)
    //The method checks if the Value exist in the Cache if the request is made from a valid user thread.
            If (checkAccess);
                    return super.containsValue(oValue);
    public Collection values( )
            // Returns a Collection of values in the cache if the request is made from a valid user thread.
            If (checkAccess)
                    return super.values( );
    public Map getAll(Collection colKeys)
            // returns a Set of cache keys that satisy the passed filter if the request is made from a valid user thread
    public Set keySet(Filter filter)
            //returns a set of entries for a given filter if the request is made from a valid user thread.
    Subject getCurrentSubject( )
            //returns the Subject passed from the user request thread to the EntitledNamedCache.
            SecurityManager manager = SystemgetSecurityManager( );
                if manager.getSubject( ) is true
                    return manager.getSubject( );
                else
                    return null;
    void checkAccess( )
    //checks if the subject passed to the EntitledNamedCache has a valid Principal assigned.
    if (!principalAssigned(getCurrentSubject( ))
            throw Security Exception (and die);
```

Pseudo code for some of the functionality associated with an visitor browser history security provider to authorize authenticated users is implemented as follows:

```
package com.oracle.cx.chat.security;
public class VBHSecurityProvider extends AbstractSecurityProvider {
    public boolean authorize(String user)
{
        check authorization;
        if user is authorized
            return true;
        else
            return false;
}}
```

As disclosed, embodiments provide support for a multi-tenancy enabled in-memory data grid, including data management and security management. Some embodiments provide a subject aware cache that can be used to store information associated with a visitor to a website. If authenticated and authorized, an agent of the website can access the cached information. In some embodiments, visitor information includes visitor browser history.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A system of providing a cloud-based multi-tenant data grid comprising:
a random access memory (RAM) storing a multi-tenant data grid including a plurality of multi-tenant data grid tables, each multi-tenant data grid table having a name, including a data grid label and a tenant identifier, and a plurality of data grid entries, the multi-tenant data grid being an in-memory cache for a single instance of a software application; and
a processor, coupled to the RAM, configured to:
receive, from the single instance of the software application, a request for a data grid entry containing a browser history of a visitor to a website, the request including a data grid label associated with browser history data, a tenant identifier associated with the website, and a visitor identification, the requester being associated with an agent of the website;
authenticate and authorize the request for the data grid entry based on the tenant identifier; and
provide the data grid entry to the single instance of the software application.

2. The system of claim 1, wherein the processor is further configured to:
receive requester identification information,
authenticate the request by checking a credential cache based on the requester identification information, and
if no entry is returned, check a credential store and create an entry in the credential cache for the requester identification information.

3. The system of claim 1, wherein the requester is a chat application used by the agent.

4. The system of claim 1, wherein the processor is further configured to:
receive data, a data grid label, and a tenant identifier;
determine if a multi-tenant data grid table exists in the multi-tenant data grid based on the received data grid label and tenant identifier;
if not, create the multi-tenant data grid table; and
store the data in an entry in the multi-tenant data grid based on the multi-tenant data grid table.

5. A method of providing a cloud-based multi-tenant data grid, the method comprising:
creating a multi-tenant data grid in random access memory (RAM), the multi-tenant data grid including a plurality of multi-tenant data grid tables, each multi-tenant data grid table having a name, including a data grid label and a tenant identifier, and a plurality of data grid entries, the multi-tenant data grid being an in-memory cache for a single instance of a software application;
receiving, from the single instance of the software application, a request for a data grid entry containing a browser history of a visitor to a website, the request including a data grid label associated with browser history data, a tenant identifier associated with the website, and a visitor identification, the requester being associated with an agent of the website;
authenticating and authorizing the request for the data grid entry based on the tenant identifier; and
providing the data grid entry to the single instance of the software application.

6. The method of claim 5, further comprising:
receiving requester identification information,
wherein the authenticating includes checking a credential cache based on the requester identification information, and if no entry is returned, checking a credential store and creating an entry in the credential cache for the requester identification information.

7. The method of claim 5, wherein the requester is a chat application used by the agent.

8. The method of claim 5, further comprising:
receiving a data entry, a data grid label, and a tenant identifier;
determining if a multi-tenant data grid table exists in the multi-tenant data grid based on the received data grid label and tenant identifier;
if not, creating the multi-tenant data grid table; and
storing the data entry in the multi-tenant data grid based on the multi-tenant data grid table.

9. A non-transitory computer readable medium with instructions stored thereon to provide a cloud-based multi-tenant data grid, the providing comprising:
creating a multi-tenant data grid in random access memory (RAM), the multi-tenant data grid including a plurality of multi-tenant data grid tables, each multi-tenant data grid table having a name, including a data grid label and a tenant identifier, and a plurality of data grid entries, the multi-tenant data grid being an in-memory cache for a single instance of a software application;
receiving, from the single instance of the software application, a request for a data grid entry containing a browser history of a visitor to a website, the request including a data grid label associated with browser history data, a tenant identifier associated with the website, and a visitor identification, the requester being associated with an agent of the website;
authenticating and authorizing the request for the data grid entry based on the tenant identifier; and
providing the data grid entry to the single instance of the software application.

10. The non-transitory computer readable medium of claim 9, the providing further comprising:
receiving requester identification information,
wherein the authenticating includes checking a credential cache based on the requester identification information, and if no entry is returned, checking a credential store and creating an entry in the credential cache for the requester identification information.

11. The non-transitory computer readable medium of claim 9, wherein the requester is a chat application used by the agent.

12. The non-transitory computer readable medium of claim 9, the providing further comprising:
receiving a data entry, a data grid label, and a tenant identifier;
determining if a multi-tenant data grid table exists in the multi-tenant data grid based on the received data grid label and tenant identifier;
if not, creating the multi-tenant data grid table; and
storing the data entry in the multi-tenant data grid based on the multi-tenant data grid table.

13. The system of claim 1, wherein the data grid label identifies the type of data stored in the multi-tenant data table.

14. The method of claim 5, wherein the data grid label identifies the type of data stored in the multi-tenant data table.

15. The non-transitory computer readable medium of claim 9, wherein the data grid label identifies the type of data stored in the multi-tenant data table.

16. The system of claim 1, wherein the multi-tenant data grid further comprises a plurality of non-multi-tenant data tables, each non-multi-tenant data table having a name and a plurality of data grid entries, the name including a data grid label identifying the type of data stored in the non-multi-tenant data table.

17. The method of claim 5, wherein the multi-tenant data grid further comprises a plurality of non-multi-tenant data tables, each non-multi-tenant data table having a name and a plurality of data grid entries, the name including a data grid label identifying the type of data stored in the non-multi-tenant data table.

18. The non-transitory computer readable medium of claim 9, wherein the multi-tenant data grid further comprises a plurality of non-multi-tenant data tables, each non-multi-tenant data table having a name and a plurality of data grid entries, the name including a data grid label identifying the type of data stored in the non-multi-tenant data table.

* * * * *